United States Patent Office 2,799,206
Patented July 16, 1957

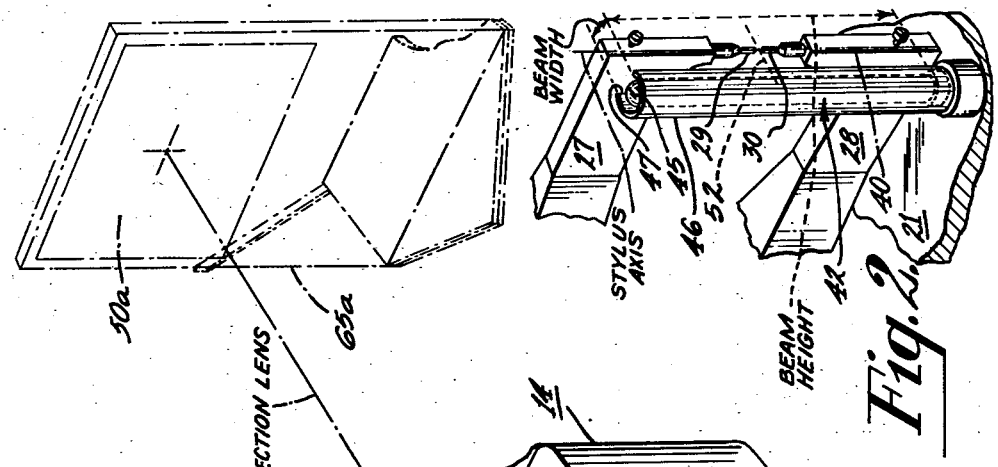

2,799,206

WIDE RANGE OPTICAL PROJECTION CONTOUR INSPECTION SYSTEM

Leon B. Fuller, Springfield, Vt., assignor to Jones and Lamson Machine Company, a corporation of Vermont Application September 21, 1956, Serial No. 611,103

9 Claims. (Cl. 88—24)

The present invention relates to optical projection inspection systems for use in industry to determine the conformity of manufactured parts to predetermined standards. More particularly, the present invention relates to wide-range optical-projection inspection systems of the type adapted for inspecting contoured and recessed surfaces in manufactured parts or devices that cannot be projected directly in a light beam.

To meet the problem of inspecting a contoured surface that cannot be projected directly, such as a recessed surface in a die for example, for accuracy of shape, the surface inaccessible to parallel light may be explored with a tracing stylus that is moved along the surface to be inspected and is rigidly connected to move jointly or as a unit with a similar follower or projection stylus in spaced relation thereto. The follower stylus generally has the same size and shape as the tracing stylus and is placed in a beam of light through which it moves as it partakes exactly of the movement of the tracing stylus. An enlarged profile shadow of the follower stylus on an illuminated background is projected onto a viewing screen and moves across the illuminated screen in relation to an enlarged master chart or outline of the contour to be measured or inspected. This is generally represented by black line indicia applied to the surface of the screen as an enlargement of the contour of the surface to be inspected. If the part or surface contour thereof is to pass inspection, the trace of the movement of the follower stylus must conform with the master chart outline. In the case of the moving follower stylus, the tip of the projected shadow moves along the master outline of the contoured surface to be inspected, both being on a magnified scale, so that inaccuracies in the surface may readily be seen.

An improved contour inspection system of the wide-range type is shown, described and claimed in a copending application of Arthur J. Coakley for Optical Projection Contour Inspection System, filed July 5, 1955, Serial No. 519,820, and assigned to the same assignee as this application.

In the improved optical inspection system referred to, a wide-angle projection or viewing lens is provided between the viewing screen area and a traceable plane in which the follower stylus moves. By moving the follower stylus in the field of view of the lens, which is far larger than its own diameter and directly proportional to its distance from the center of the lens, the movement of the stylus may faithfully be reproduced on the screen with any desired magnification. To this end, the screen is placed a similar or greater distance from the center of the lens on the opposite side from the traceable area in which the follower stylus moves. The magnification attained is a function of the relative distances of the stylus and of the screen from the center of the lens. This permits a relatively wide range of tracing movement and a relatively wide range of movement for the projected stylus image.

In the wide-range optical-projection contour inspection system referred to, the projection light source for the follower or image stylus may be a rear-illuminated translucent screen of ground glass or the like, placed closely adjacent to the follower stylus and of an area sufficient to provide background illumination for its movement in response to movement of the tracing stylus, whereby at all times the follower stylus provides a silhouette image against the screen or light source in the field of the wide angle viewing lens. The screen or light source may be illuminated by a suitable electric lamp. The light from the screen, with the image of the follower stylus, is projected onto the receiving or viewing screen through the intermediary of the wide-angle projection or viewing lens which is interposed between the follower stylus and the viewing screen at distances along the lens axis to provide a desired magnification of the follower stylus when projected upon the viewing screen.

With a light source such as an enlarged translucent screen, the entire viewing screen, which may be of ground glass or similar translucent material, is illuminated by the projected light. The light source must be arranged to provide an illuminated background for entire area of movement of the follower stylus. This lighting arrangement for the follower stylus thus provides uniform illumination or projection light for all directions of planar movement of the follower stylus. It is preferable, however, to illuminate the follower stylus by simplified means providing more limited illumination without impairing the image projection of the follower stylus over the relatively wide range of planar movement desired. In one form of illumination of the follower stylus, the follower stylus means includes an opaque casing having a translucent screen of limited area, a lamp in the casing, and an opaque mask on the screen having the shape of the tracking or inspection stylus, all carried by the moving tracing system with the movable tracking stylus and the connecting link. Such arrangement, however, provide an appreciable load on the delicately mounted and sensitive moving elements of the tracing system, in addition to the complication and cost involved.

It is therefore an object of the present invention, to provide improved and simplified light projection means for a wide-range optical-projection contour inspection system of the type referred to, which provides effective illumination for a follower stylus over a relatively wide range of movement, without enlarging the illumination means or appreciably loading the moving parts.

It is also a further object of this invention, to provide improved light projection means for wide-range optical-projection contour inspection system of the type referred to which is particularly adapted for use with double tracing and follower stylus means for effecting a calipering tracing of sectional areas of a body to be inspected.

It is also an important and specific object of this invention, to provide improved light projection means for a wide-range optical-projection contour inspection system of the type referred to, which eliminates the widely illuminated light screen as a field of movement for the follower stylus and movable light screen means carried by the follower stylus, while effecting improved local illumination of the follower stylus without loading the moving stylus system or reducing its sensitivity.

In accordance with the invention, with either a single or a double tracing and follower stylus system, the follower stylus or styli move on a common (vertical) axis in an elongated beam of light provided by a light source extending along and parallel with that axis. The light source and the styli are axially parallel and are carried by common means which may be the horizontally movable carriage element of the system. Since the light source thus moves horizontally with the styli while in (vertical) axially parallel alignment therewith, a relatively narrow band or beam of light from the source may be provided and made as narrow as the width of the styli and yet be effective to provide a contour trace on the viewing screen. At the same time, the light source does not load or impede the movement of the stylus or styli since it is independent of and effectively detached therefrom.

More broadly in accordance with the invention, with styli subject to guided movement in two different directions in a plane for contour inspection or tracing under control of corresponding tracing styli, a wide angle or "photoscopic" projection lens is fixed with its optical axis normal to said plane at substantially the center of stylus movement or tracing area, and aligned, directly or through mirrors, with a viewing screen. The narrow elongated light source is aligned with the styli and the lens on the opposite side of the plane from the lens, and provides narrow beam or band illumination of the styli along one (vertical) direction of stylus movement and is guided with the styli in the other (horizontal) direction of stylus movement, so that the trace of the styli on the viewing screen is sharp and clear in a narrow (vertical) band of light at all times.

The novel features that are considered to be characteristic of this invention are set forth with particularity in the appended claims. The invention itself, however, both to its organization as well as additional objects and advantages thereof may further be considered from the following description when read in connection with the accompany drawing in which:

Figure 1 is a view in perspective of a wide-range optical-projection contour inspection apparatus provided with a stylus arrangement and light projection means embodying the invention, and Figure 2 is an enlarged fragmentary view of a portion of the apparatus of Figure 1 including the styli means and the light projection means, showing further details thereof, in accordance with the invention.

Referring to the drawing, the wide range optical projection contour inspection apparatus or system disclosed as a preferred embodiment of the invention is provided with two hard-tipped tracing elements or styli 5 and 6 for jointly tracing sections of a work piece 8, such as a turbine blade at different points or sections along its axis. The work piece is mounted or rests on a mounting fixture 9 which moves longitudinally on a flat work table 10 under control of a suitable handwheel 11. The work table is fixed to the top flat surface 12 of a relatively heavy and rigid main base 14 for the apparatus, which in turn is mounted on or supported by a floor, table or the like, providing a horizontal level supporting surface 15.

The work table 10 is moved in a longitudinal direction with respect to the work piece 8 to permit the calipering tracing styli to trace various sections of the work piece and, in the case of a turbine blade, to measure its contour throughout various sections along its length. With the work piece positioned, as shown in the drawing, to trace a section of the work piece, the tracing styli 5 and 6, arranged vertically one above the other on a common vertical axis, are moved jointly transversely, or in a horizontal direction in the present example, by means of a ball-bearing-slide tracing fixture 18. This comprises a slotted vertical housing 20 mounted on and carried by a transversely movable carriage 21 which moves on ball bearing guides 22 on a base member 23, carried by the flat top surface 12 of the main base 14 in spaced relation to the work table 10 and the mounting fixture 9 for the work piece 8. The carriage 21 and the housing 20 of the tracing fixture 18 affixed thereto are transversely movable by means connected with a hand wheel 25, to traverse the tracing styli 5 and 6 across the work piece at each section.

The tracing styli 5 and 6 are mounted in the curved forward ends of upper and lower stylus spacing or carrier bars 27 and 28 respectively. The carrier bars extend through the slotted housing 20 in spaced parallel relation to each other and the curved rear ends are provided with follower or projection styli 29 and 30 respectively. The projection styli are mounted vertically one above the other on a common vertical axis in the same relation as the tracing styli. The follower stylus 29 is thus rigidly connected to and moves with the tracing stylus 5, while the projection stylus 30 is rigidly connected to and moves with the tracing stylus 6. The tracing and projection styli are thus arranged in pairs and are confined to vertical movement by ball bearing guide means in the housing 20 represented by upper elongated guide blocks 32, one of which is indicated, connected with the carrier bar 27, and lower elongated guide blocks 33, one of which is indicated, connected with the carrier bar 28. The guide blocks move in ball bearing guides in the housing as indicated at 34 and 35. The carrier bar 27, together with the tracing stylus 5 and the projection stylus 29, tends to move downwardly under the force of gravity to engage the surface of the work piece through contact with the tracing stylus 5, and the tracing stylus 6 and the projection stylus 30 are biased upwardly against gravity by means of a compression spring indicated at 37, in engagement with the guide block 33, to bring the lower tracing stylus 6 into contact with the work piece. Since the carriage 21 is arranged to move in a lateral direction or horizontally in the present example, while the carrier bars 27 and 28 move vertically as the tracing styli 5 and 6 follow the contoured surfaces of the work piece 8 to be inspected, the follower or projection styli 29 and 30 traverse a similar path in space in a vertical plane corresponding to movement of the tracing styli 5 and 6.

In accordance with the present invention, the follower styli move vertically on a common axis indicated by the dash-and-dot line 40 in Figure 2, in an elongated beam of light provided by a light source 42 extending along and parallel with that axis. The light source and the styli are relatively axially parallel and are guided by common carrier means which is the horizontally (transversely) movable carriage 21 on which the light source is directly mounted in fixed relation to the stylus axis, and with which the tracing and projecting styli are indirectly connected through the ball-bearing-slide-tracing fixture 18 which includes the stylus carrier bars 27 and 28. It will be appreciated that these bars and the ball-bearing guide mount therefor must be of rigid construction in order that the follower or projection styli can trace exactly the movement of the tracing styli.

The light source 42 comprises an elongated electric lamp, such as a neon lamp 45, partially enclosed by an opaque slotted tubular mask or casing 46, having a narrow longitudinal slot or opening 47 facing the projection styli. While the light source shown is a presently preferred form, any suitable light source may be utilized which provides narrow beam width and extended beam height, as indicated by the dimensional dotted lines and legends in Figure 2. In this wide-range type of optical-projection contour inspection system, the light from the source, with the images of the follower styli 29 and 30, is projected onto a receiving screen 50, of translucent material such as ground glass, through the intermediary of a wide-angle lens 51 interposed between the styli 29 and 30 and the screen. The latter is at a distance along the lens axis 52 to provide a desired magnification of the styli when projected on the screen, as indicated by the projected images 54 and 55 of the styli 29 and 30 respectively. The images move on the screen 50 with respect to a gage or indicia comprising an outline 57 applied to the surface of the screen, directly or by overlay, representing the desired shape of the section of the work piece 8 being inspected.

In the present example, the beam axis is folded back, as indicated by the dotted lines 59 and 60, by means of reflecting mirrors 61 and 62 placed to intercept the beam along the axis and provide the image on the screen when placed at a convenient viewing position, as in the present example, for frontal viewing with respect to the operation of the system. Thus as the tracing styli 5 and 6 follow the contoured surfaces of the work piece 8 in a predetermined section, by traversing movement of the fixture 18, the follower or projection styli 29 and 30, moving in conformity therewith in a one-to-one ratio both horizontally and vertically, are projected as enlarged images 54 and 55 on the viewing screen 50, and follow the indicia or gage line 57 exactly if the contour surface of the work piece 8 conforms with a predetermined standard.

The receiving or viewing screen 50 is mounted on a suitable movable frame 65 which rests on the floor or supporting surface 15 and may readily be moved for alignment of the screen with the mirror 62 so that the beam axis 60 therefrom passes directly through the center of the screen as shown. The frame and screen also may be moved to an alternate position as shown by the dotted outline 65a to bring the viewing screen 50a directly in line with the projection lens axis 52, for direct projection when desirable, thereby eliminating the use of the mirrors 61 and 62 in certain cases. This arrangement may be used for tracing or copying contours directly on an overlay screen if desired.

Since the light source is effectively the narrow elongated slot which moves horizontally (transversely) with the projection styli in axially parallel fixed alignment therewith, the band or beam of light from the source may be made as narrow as the width of the styli and yet be effective to provide contour tracing on the viewing screen. This narrow band of light appears on the viewing screen to provide a sharp outline of the projected styli images 54 and 55 and is indicated by the light area between the dotted lines 67 and 68 on the viewing screen.

Further in accordance with the invention, it will be seen that with this arrangement, the light source does not load or impede movement of the styli since it is independent of and effectively detached from the styli. The projection styli are subject to unimpeded guided movement in two different directions in a common (vertical) plane, for contour tracing under control of the corresponding tracing styli. A wide angle or "photoscopic" projecting lens is fixed with its optical axis normal to said plane at substantially the center of stylus movement or tracing area and aligned, directly or through mirrors, with a viewing screen of translucent material. As shown in more detail in Figure 2, the narrow elongated light source is aligned with the styli and the lens on the opposite side of the plane of movement, and provides narrow beam or band illumination of the projection stylus along one (vertical) direction of stylus movement and is guided and carried with, but independent of, the styli in the other (horizontal) direction of stylus movement, so that the tracing images of the styli on the viewing screen are sharp and clear in a narrow (vertical) band of light at all times, as indicated in Figure 1.

While the embodiment shown and described includes a double stylus contour tracing means, it will be seen that the invention is readily applicable to contour tracing means wherein a single pair of styli are provided such, for example, as the styli 5 and 29, in which case the lower styli and connecting carrier bar are omitted from the tracing fixture. In this case the single projection stylus 29, confined to vertical movement along the same axis will move in parallel relation to the light source in the same manner as described, for projection of an image on a screen.

A wide-angle optical-projection contour inspection system embodying the invention thus provides simplified and effective illumination and projection of the tracing styli or stylus, and operates to eliminate widely illuminated light screens and the like as a field of movement of the follower stylus, as well as tracing stylus. In this way loading of the moving system of the apparatus and a reduction in sensitivity is prevented, while at the same time enhanced visibility for the projected images is attained precisely in the area where the operator's attention should be directed.

What is claimed is:

1. In an optical-projection inspection system, the combination with a wide-angle projection lens having a predetermined axis, a tracing stylus element mounted for contour tracing movement in two directions in a single plane, and a follower stylus element connected for conjoint movement with said first stylus element in a planar field viewed by said lens at a distance therefrom along and normal to said axis, of means for illuminating said follower stylus element to provide a projected shadow image thereof through said lens, means for confining the illumination of said follower stylus element to a narrow band extending along and substantially parallel to said element in one direction of movement, and means connecting said illuminating means with said stylus elements for conjoint movement therewith in the other direction of movement.

2. In an optical-projection inspection system, the combination with a wide-angle projection lens having a predetermined axis, a tracing stylus element mounted for contour tracing movement in two directions in a single plane, and a follower stylus element connected for conjoint movement with said first stylus element in a planar field viewed by said lens at a distance therefrom along and normal to said axis, of carriage means for said stylus elements providing guided movement thereof in one direction, and means mounted on said carriage means for illuminating said follower stylus element to provide a projected shadow image thereof through said lens, said illuminating means comprising an elongated electric lamp and a mask element for the lamp for confining the illumination of said follower stylus element to a narrow band extending along and substantially parallel thereto in the other direction of movement and in fixed relation thereto.

3. In an optical-projection inspection system, the combination with a fixed wide-angle lens having a predetermined axis, and a moving stylus system for contour surface tracing in two different directions having a follower stylus element movable in a planar field viewed by said lens and at a distance therefrom along and normal to said axis, of means for illuminating said follower stylus element to provide a projected shadow image thereof through said lens, means for confining said illumination to a relatively narrow band extending along the path of movement of said follower stylus element in one direction in fixed relation thereto, and carriage means connected to move with and guide said illuminating means and moving stylus system in the other direction of movement.

4. In an optical-projection inspection system, the combination with a fixed wide-angle lens having a predetermined axis, and a moving stylus system for contour surface tracing having a follower stylus element movable axially and laterally in a planar field viewed by said lens and at a distance therefrom along and normal to said axis, of elongated electric lamp means for illuminating said follower stylus element to provide a projected shadow image thereof through said lens, said lamp means being fixedly mounted in substantially axially-parallel spaced relation to said follower stylus element and masked to provide illumination thereof in a relatively narrow band extending along the path of axial movement of said follower stylus element, and movable carriage means connected to support and guide said lamp means and moving stylus system in the direction of lateral movement of said follower stylus element.

5. In an optical-projection inspection system, the combination with a fixed wide-angle projection lens having a predetermined axis, a movable tracing stylus, and a follower stylus connected for conjoint movement with said tracing stylus in a planar field viewed by said lens and at a distance therefrom along and normal to said axis, of means for guiding and controlling movement of said styli in two directions, and means carried by said guiding and controlling means and aligned with the follower stylus element for illuminating said follower stylus element in a narrow beam along one direction of movement thereof and substantially parallel therewith and being movable with the follower stylus in the other direction of movement in fixed relation thereto.

6. In an optical-projection inspection system, the combination with a fixed wide-angle projection lens having a predetermined axis, a pair of vertically-aligned movable tracing styli, and a pair of vertically aligned follower styli connected for conjoint movement in pairs with said tracing styli in a planar field viewed by said lens and at a distance therefrom along and normal to said axis, of means for guiding and controlling movement of said styli in vertical and lateral directions, and means carried by said guiding and controlling means and aligned with the follower styli for illuminating said follower styli in a narrow beam along the vertical axis of movement thereof and substantially parallel therewith and being movable with the follower styli in the lateral direction of movement in fixed relation thereto.

7. In an optical-projection inspection system, the combination with a fixed wide-angle projection lens having a predetermined axis, a pair of relatively movable tracing stylus elements on a common vertical axis, and a pair of relatively movable follower stylus elements on a common vertical axis connected for conjoint movement in pairs each with one of said tracing stylus elements, said follower stylus elements being positioned for movement in a planar field viewed by said lens and at a distance therefrom along said axis, of means for guiding and controlling movement of said stylus elements along said vertical axes and transversely in a direction normal to the lens axis, fixed means carried by said guiding and controlling means providing a narrow elongated light source for illuminating said follower stylus elements along the vertical axis and on the opposite side of said field from the lens, said illuminating means being substantially axially parallel and movable with the follower stylus elements in the transverse direction of movement in fixed spaced relation thereto.

8. In an optical-projection contour-inspection system, the combination with a wide-angle projection lens having a predetermined axis, a tracing stylus element mounted for contour tracing movement vertically and laterally in a single plane, and a follower stylus element connected for conjoint and same directional movement with said tracing stylus element in a planar field viewed by said lens at a distance therefrom along said axis, of means for illuminating said follower stylus element to provide a projected shadow image thereof through said lens, said illuminating means including an elongated light source parallel with and extending along the axis of vertical movement of the follower stylus element and masked to provide a narrow elongated beam of light thereon, and a laterally movable carriage supporting and guiding said stylus elements and illuminating means for lateral movement in fixed relation.

9. In an optical-projection contour-inspection system, the combination with a fixed wide-angle projection lens having a predetermined axis, tracing stylus elements mounted for contour tracing movement on a common vertical axis, and follower stylus elements connected with said first stylus elments for conjoint movement therewith on a second vertical axis in a planar field viewed by said lens at a distance therefrom along and normal to said axis, of movable carriage means supporting and guiding said stylus elements for conjoint lateral movement horizontally, means for illuminating said follower stylus elements to provide a projected shadow image thereof through said lens, said illuminating means comprising an elongated electric lamp of the neon type mounted vertically on said carriage means in fixed axially relation to and spaced from said follower stylus elements on the opposite side of said planar field from said lens, an elongated casing for said lamp having a light-emitting slot facing said follower stylus elements to provide a narrow elongated beam of light in response to energization of said lamp of a width to illuminate the follower stylus elements in width and of a length to illuminate the follower stylus elements throughout the axial vertical movement thereof.

No references cited.